(12) United States Patent
Stokking et al.

(10) Patent No.: US 11,109,092 B2
(45) Date of Patent: Aug. 31, 2021

(54) SYNCHRONIZING PROCESSING BETWEEN STREAMS

(71) Applicant: Koninklijke KPN N.V., Rotterdam (NL)

(72) Inventors: Hans Maarten Stokking, Wateringen (NL); Omar Aziz Niamut, Vlaardingen (NL)

(73) Assignee: KONINKLIJKE KPN N.V., Rotterdam (NL)

( * ) Notice: Subject to any disclaimer, the term of this patent is extended or adjusted under 35 U.S.C. 154(b) by 21 days.

(21) Appl. No.: 16/470,518

(22) PCT Filed: Dec. 18, 2017

(86) PCT No.: PCT/EP2017/083335
§ 371 (c)(1),
(2) Date: Jun. 17, 2019

(87) PCT Pub. No.: WO2018/114814
PCT Pub. Date: Jun. 28, 2018

(65) Prior Publication Data
US 2019/0313144 A1     Oct. 10, 2019

(30) Foreign Application Priority Data
Dec. 20, 2016 (EP) .................... 16205213

(51) Int. Cl.
*H04N 21/43* (2011.01)
*H04N 21/2343* (2011.01)
(Continued)

(52) U.S. Cl.
CPC ... *H04N 21/4307* (2013.01); *H04N 21/21805* (2013.01); *H04N 21/234336* (2013.01);
(Continued)

(58) Field of Classification Search
CPC .......... H04N 21/4307; H04N 21/6587; H04N 21/234345; H04N 21/8456;
(Continued)

(56) References Cited

U.S. PATENT DOCUMENTS

2014/0282766 A1   9/2014  Good
2014/0337903 A1*  11/2014 Zhu .................... H04N 21/2355
(Continued)

FOREIGN PATENT DOCUMENTS

WO   WO 2015/004131 A1   1/2015
WO   WO 2018/011054      1/2018
WO   WO 2018/050606      3/2018

OTHER PUBLICATIONS

European Search Report for International Appl. No. 16205213.8, entitled "Synchronizing Processing Between Streams," consisting of 10 pages, dated Mar. 10, 2017.
(Continued)

*Primary Examiner* — Anthony Bantamoi
(74) *Attorney, Agent, or Firm* — Hamilton, Brook, Smith & Reynolds, P.C.

(57) ABSTRACT

A client device is facilitated to synchronize streaming and processing a second stream to streaming and processing a first stream. Both streams may share a common content timeline. The second stream may be buffered in a data storage. A request for streaming a content part of the second stream may be received. The request may be indicative of a selected time point on the common content timeline from which point onwards the second stream is to be processed. The second stream may then be transcoded to obtain a transcoded second stream. The transcoding may create a random access point in the transcoded second stream from which point onwards the client device is able to decode the transcoded second stream, wherein the random access point is nearer in time to the selected time point than any random
(Continued)

access point of the second stream. The transcoded second stream may then be streamed to the client device instead of the non-transcoded second stream, thereby providing the client device with direct access to a part, such as a frame, of said second stream.

14 Claims, 12 Drawing Sheets

(51) Int. Cl.
  *H04N 21/647* (2011.01)
  *H04N 21/845* (2011.01)
  *H04N 21/6587* (2011.01)
  *H04N 21/218* (2011.01)
  *H04N 21/438* (2011.01)

(52) U.S. Cl.
  CPC ............. *H04N 21/234345* (2013.01); *H04N 21/4384* (2013.01); *H04N 21/64784* (2013.01); *H04N 21/6587* (2013.01); *H04N 21/8455* (2013.01); *H04N 21/8456* (2013.01)

(58) Field of Classification Search
  CPC ......... H04N 21/21805; H04N 21/4384; H04N 21/234336; H04N 21/64784; H04N 21/8455; H04N 21/43072
  See application file for complete search history.

(56) References Cited

U.S. PATENT DOCUMENTS

2015/0135206 A1* 5/2015 Reisman .......... H04N 21/26283
2016/0156950 A1   6/2016 Bangma et al.

OTHER PUBLICATIONS

International Search Report for International Appl. No. PCT/EP2017/083335 entitled, "Synchronizing Processing Between Streams," consisting of 13 pages. dated Mar. 2, 2018.
Steglich, S., "360 Video Experience on TV Devices," Fraunhofer Fokus, [retrieved from www.fokus.fraunhofer.de/go/360] (Apr. 2016).
Manzato, D.A.G., et al., "A Survey of Channel Switching Schemes for IPTV," pp. 120-127, *IEEE Communications Magazine* (Aug. 2013).
Ramos, F. M.V., et al., "Reducing Channel Change Delay in IPTV by Predictive Pre-joining of TV Channels," *Signal Processing: Image Communication* 26, pp. 400-412 (2011).
Linck, S., et al., "Adaptive Multimedia Streaming Using a Simulation Test Bed," Mar. 2014.
Smith, J. R., et al., "Transcoding Internet Content For Heterogeneous Client Devices," *Proc. IEEE Int. Conf. on Circuits and Syst. (ISCAS)* (1998).
Park, C. S., et al., "Video Transcoding to Support Playback at a Random Location for Scalable Video Coding," *IEEE Transactions on Consumer Electronics*, vol. 53, No. 1, pp. 227-234 (2007).
Ochi, D., et al. "Live Streaming System for Omnidirectional Video", *Virtual Reality, IEEE* (2015).

* cited by examiner

SYNCHRONIZING PROCESSING BETWEEN STREAMS

This application is the U.S. National Stage of International Application No. PCT/EP2017/083335, filed Dec. 18, 2017, which designates the U.S., published in English and claims priority under 35 U.S.C. § 119 or 365(c) to Europe Application No. 16205213.8, filed Dec. 20, 2016. The entire teachings of the above applications are incorporated herein by reference.

FIELD OF THE INVENTION

The invention relates to a method for facilitating a client device to start processing a second stream, which is received by streaming, synchronously with the processing of a first stream, and to a network element configured for the same. The invention further relates to the client device. The invention further relates to a computer program comprising instructions for causing a processor system to perform the method.

BACKGROUND ART

Media content such as video content and audio content is commonly delivered to users in a digital form. If media content has a temporal aspect, and in particular is associated with a timeline which indicates how the media content is to be played-out over time, such digital form is typically referred to as a media stream, or simply as 'stream'. Streams may be delivered to a receiver of a user, henceforth also referred to as 'client device', via a network. In particular, a stream may be streamed to a client device, which allows the client device to process the stream before having received the entire stream. Examples of streams include video streams such as camera-recorded or computer-rendered streams, audio streams such as microphone-recorded streams, timed text streams such as subtitle streams or social-media streams, timed events streams which show an advertisement image or perform an action at the receiver, and multimedia streams comprising different types of media streams.

Different streams may be associated with a common content timeline in that there may be a temporal relationship between the streams of a group of streams with respect to their processing. For example, the streams may be meant to be played-out synchronously, which is also known as 'inter-stream' synchronization in the field of media synchronization. In a specific example, a first video stream may represent a recording of an event from a first camera angle and a second video stream may represent a recording from a different camera angle. Accordingly, the group of streams may represent a multi-camera multi-angle recording. Another example is a Virtual Reality (VR) video which is comprised of several streams each representing a different part of the VR video. In a specific example, the VR video may provide a panoramic view of a scene, with the term 'panoramic view' referring to, e.g., an at least 180 degree view, with the panoramic view being spatially segmented into a plurality of video streams which each provide a different view of the scene. In general, the streams of such a group of streams may relate to a same scene or event.

It may be desirable to start processing one stream which is received in a streaming manner synchronously with another stream from such a group of streams, e.g., to switch from a first stream to a second stream. An example of such processing may be play-out of the respective stream, e.g., using a display, loudspeaker, etc. However, such processing may also include any other type of real-time processing where such seamless switching is of relevance, including but not limited to so-termed stitching, e.g., creating a panorama, and recording. In general, such processing may involve or follow depacketising of packets, buffering (e.g., for jitter and/or for a decoding pipeline), decoding, buffering again (e.g., for a display buffer). Here, the term 'seamless' may refer to there being little to no noticeable delay between the switching of streams, which may in turn require the processing of the second stream to start quickly after or even before the processing of the first stream ceases, but also the processing of the second stream to start at a same or similar point on the common content timeline as where the processing of the first stream ceases. It may also occur that the processing of the first stream continues. In this case, the term 'seamless' may refer to the processing of both streams being inter-stream synchronized.

In general, the 'synchronize processing' may refer to the processing of the second stream starting synchronously with that of the first stream, irrespective of whether the processing of the first stream continues or not. The latter is in some examples referred to as 'switching', in which case it may also be of importance that the processing of the second stream starts quickly after or even before the processing of the first stream ceases. Disadvantageously, the start of processing of a second stream may not always be sufficiently synchronized with the processing of a first stream.

For example, in VR video, the delay between the user physically changing viewing angle, and the new view actually being rendered by the VR rendering device, may be large. This delay is henceforth also referred to as 'switching latency', and may be sizable due to an aggregate of delays, which includes the delay between requesting a new stream and the new stream actually arriving at the client device. This delay has been addressed by the co-pending applications EP16179654.5 and EP16188706.2. However, there may be other delays contributing to the switching latency. For example, when a VR video is rendered on a Head Mounted Display (HMD), there may be a delay in the measurement of a head rotation of a user.

The inventors have recognized that yet another sizeable delay resides in the decoding of the video streams by the client device. Namely, streams may be encoded such that individual parts of the stream may not always be decodable independently but rather only in combination with other parts. A specific example may be that several frames of a video may be encoded as a Group of Pictures (GOP), with only so-termed I-frames being independently decodable, and thus represent so-termed random access points in the stream, whereas other types of frames, e.g., P-frames or B-frames, may not be independently decodable. This may result in a client device not being able to decode the first frame which may be received, and rather having to wait until an I-frame is received. As such, there may be a sizable delay between receiving a stream and being able to start the processing.

This problem has been addressed in the context of IPTV, e.g., as described by "*A survey of channel switching schemes for IPTV*" by Manzato et al., IEEE Communications Magazine, 51(8), 120-127. Here, 'fast channel change' or 'rapid channel change' solutions are described which generally involve delivering a new stream by unicast from a cache while starting the delivery with an I-frame. Accordingly, a client device may immediately decode the first frame which is received.

A disadvantage of 'fast channel change' approaches is that they are unsuitable for enabling a client device to switch between streams from a group of streams which are associated with a common content timeline, or in general to start processing a second stream in a synchronized manner with a first stream. Namely, 'fast channel change' does not enable a switching between time-aligned streams in which the processing, e.g., play-out, of a second stream continues at a same or similar point on the common content timeline as where the processing of a first stream is in time.

SUMMARY OF THE INVENTION

It would be advantageous to enable a client device to start processing second stream in a synchronized manner with the processing of a first stream.

In accordance with a first aspect of the invention, a method may be provided for facilitating a client device to synchronize streaming and processing a second stream to streaming and processing a first stream, wherein the first stream and the second stream may be part of a group of streams, wherein the streams of the group may be associated with a common content timeline. The method may comprise:
  buffering the second stream in a data storage;
  receiving a request for streaming a content part of the second stream to the client device, the request being indicative of a selected time point on the common content timeline from which point onwards the second stream is to be processed;
  transcoding the second stream to obtain a transcoded second stream, wherein the transcoding is configured to create a random access point in the transcoded second stream from which point onwards the client device is able to decode the transcoded second stream, wherein the random access point is nearer in time to the selected time point than any random access point of the second stream; and
  streaming the transcoded second stream to the client device.

In accordance with another aspect of the invention, a transitory or non-transitory computer-readable medium may be provided comprising a computer program. The computer program may comprise instructions for causing a processor system to perform the method.

In accordance with another aspect of the invention, a transitory or non-transitory computer-readable medium may be provided comprising a computer program. The computer program may comprise instructions for causing a processor system to perform the method.

In accordance with another aspect of the invention, a network element may be configured to facilitate a client device to synchronize streaming and processing a second stream to streaming and processing a first stream, wherein the first stream and the second stream may be part of a group of streams, wherein the streams of the group may be associated with a common content timeline. The network element may comprise:
  a data storage configured to buffer the second stream;
  a network interface configured to receive a request for streaming a content part of the second stream to the client device, the request being indicative of a selected time point on the common content timeline from which point onwards the second stream is to be processed;
  a processor configured to transcode the second stream to obtain a transcoded second stream, and to create a random access point in the transcoded second stream from which point onwards the client device is able to decode the transcoded second stream, wherein the random access point is nearer in time to the selected time point than any random access point of the second stream;
  wherein the network interface is further configured to stream the transcoded second stream to the client device.

In accordance with another aspect of the invention, a client device may be configured for streaming and processing a selected stream of a group of streams, wherein the streams of the group may be associated with a common content timeline. The client device may comprise:
  a network interface to a network for receiving said selected stream; and
  a processor configured to:
    determine, when processing a first stream of the group of streams, a selected time point on the common content timeline from which point onwards a second stream of the group of streams is to be streamed; and
    indicate the selected time point via the network interface to a network element which is buffering the second stream to cause the network element to transcode the second stream to obtain a transcoded second stream having a random access point at or within a neighborhood of the selected time point.

The above measures may involve facilitating a client device to synchronize streaming and processing a second stream to streaming and processing a first stream. Here, the 'streaming' may in the context of the client device refer to the client device receiving the particular stream, e.g., via a network. Moreover, the processing is in the following, by way of example, a play-out of the respective stream. Accordingly, the common content timeline is a common play-out timeline. An example of such synchronized processing may be a switching from streaming and play-out of a first stream to streaming and play-out of a second stream. The above measures may enable such switching to be performed more seamlessly, in that the play-out of the second stream may start at a same or similar point on the play-out timeline as the play-out of the first stream ceases. Here, the term 'similar' may refer to the 'stop' and 'start' points of respectively the first stream and the second stream lying within a neighborhood on the common play-out timeline, or in general refer to the start of the processing of the second stream being synchronized with that of the first stream.

For that purpose, the second stream may be buffered in a data storage outside of the client device, e.g., in a network element located upstream of the client device in a network. Here, the term 'buffering' may refer to at least a part of the second stream being stored at any given moment in time in the data storage. It is known per se to buffer streams in a network which may be requested by a client device. For example, the co-pending application EP 16188706.2 describes predicting which stream is to be requested by a client device and buffering the stream in a network cache downstream of a stream source in the network and upstream of the client device. It is noted that specifically the second stream may be buffered, or in general a subset of streams from the group of streams which are deemed likely to be requested by the client device. Alternatively, all streams from the group of streams may be buffered in the data storage, e.g., in an indiscriminate manner.

When buffering the second stream, a request for streaming a content part of the second stream to the client device may be received, e.g., from the client device itself. The client device may at that time still stream and play-out the first stream, or may already have stopped streaming and playing-out the first stream. The content part which is requested may be a 'next' content part in that it may include content of the second stream which is to be played-out after play-out of the first stream has ceased. For example, if the streams are comprised of time-aligned segments, a segment may be requested of the second stream which follows the current segment of the first stream. The request may be indicative of a selected time point on the common play-out timeline from which point onwards the second stream is to be played-out. For example, the selected time point may be at a start of the content part or in the middle thereof.

Having received the request for streaming, the second stream may be transcoded to obtain a transcoded second stream. Accordingly, the transcoding may be 'on-demand' in that it may be performed in response to a request for streaming the second stream. In order to transcode the second stream, data of the second stream which is buffered in the data storage may be used. As such, the transcoding may also pertain to a part of the second stream, and not necessarily all of the second stream. For example, the transcoding of the second stream may be performed until a request for streaming another stream is received, e.g., a third stream or again the first stream, or until the client device switches to the non-transcoded version of the second stream.

The transcoding may then be performed such that a random access point is created in the transcoded second stream from which point onwards the client device is able to decode the transcoded second stream. Such random access points are known per-se. For example, I-frames of a video stream represent such random access points. A specific example of an I-frame is an Instantaneous Decoder Refresh (IDR) frame which may be particularly advantageous since it instructs a decoder to clear the contents of the reference picture buffer, causing all subsequent transmitted frames to be decodable without reference to any frame decoded prior to the IDR frame. In general, a random access point may represent an independently decodable part of the stream which does not rely on an earlier part of the stream for decoding. The random access point may then be specifically generated at a point along the common play-out timeline which is nearer in time to the selected time point than any random access point originally present in the second stream. In a specific example, the transcoded second stream may comprise an I-frame at the selected time point whereas the second stream may comprise a P-frame or a B-frame. The transcoded second stream may then be streamed to the client device instead of or in addition to the second stream.

The above measures may have as effect that a transcoded version of the second stream is generated which may enable the client device to more synchronously start processing the (transcoded version of the) second stream than would be possible when processing the original version of the second stream. Namely, the transcoded version of the second stream may comprise a random access point nearer in time to the selected time point than the original version. As such, the client device is enabled to quicker start playing-out the transcoded version of the second stream. An advantage of the above measures may be that a more seamless switching between streams is provided. Another advantage may be that the client device is provided with direct access to a part, such as a frame, of the second stream. If the transcoding is performed 'on-demand' in response to a specific request, the second stream may be specifically transcoded to create a random access point which optimally, or sufficiently well, matches the selected time point indicated by the client device. Effectively, a 'custom' version of the second stream may be generated to facilitate the client device to start processing the second stream at a particular moment in time.

In addition, although possible, it is not needed for the transcoded second stream to consist of I-frames. Rather, it may suffice for the transcoded second stream to have the above described random access point, e.g., in the form of an I-frame, whereas subsequent frames may again include P-frames of B-frames. As such, the transcoded second stream may be relatively bandwidth efficient. Yet another advantage may be that the streams do not need to be comprised of time-aligned segments to enable start processing or switching at the segment boundaries. Rather, the streams may overlap in time, yet enable start processing or switching at the generated random access point.

In an embodiment, the random access point may be created as an independently decodable frame positioned on the common content timeline immediately preceding, immediately following or directly at the selected time point. As such, the frame nearest to the selected time point may be an independently decodable frame.

In an embodiment, the method may further comprise receiving an indication from the client device of the selected time point in the form of a byte range or a content timecode in the common content timeline. The client device may explicitly indicate the desired time point in the request, e.g., in the form of the above mentioned byte range or content timecode or in general in any other suitable form. This may have the advantage that the client device is enabled to explicitly indicate at which point in time it desires to start processing the second stream, which enables the random access point to be created in the transcoded second stream to match the desired time point.

In an embodiment, the method may further comprise:
generating a media description identifying the second stream, the media description being indicative that the second stream may be requested by the client device having a determinable random access point at or within a neighborhood of a time point in the common content timeline which is selectable by the client device; and
providing the media description to the client device.

In a related embodiment, the client device may be further configured to:
receive a media description identifying the second stream, the media description further comprising an indication that the second stream may be requested by the client device having a random access point at or within a neighborhood of a time point in the content timeline which is selectable by the client device; and
indicate the selected time point to the network element as part of a request for streaming the second stream.

It may be explicitly or implicitly indicated to the client device that the client device may request a desired time point in its request, namely by way of the media description which is provided to the client device. For example, the media description may comprise an explicit indication of said fact, e.g., by the media description comprising a respective parameter, or an implicit indication, e.g., by the media description indicating a particular version of a streaming protocol. This may have as effect that the client is made aware of the fact that a 'custom' version of the second stream may be generated and streamed which has a random access point that optimally, or sufficiently well, matches the desired time point. The client device may thus select an 'arbitrary' suitable time point rather than, e.g., adhering to segment boundaries of a group of streams having time-aligned segments.

In an embodiment, the method may further comprise:
generating a media description identifying i) the second stream ii) the transcoded second stream as an alternative representation of the second stream, and iii) at least the random access point in the transcoded second stream;

providing the media description to the client device to enable the client device to request the transcoded second stream instead of the second stream on the basis of the random access point in the transcoded second stream being nearer in time to the selected time point than any random access point of the second stream.

In a related embodiment, the client device may be further configured to:

receive a media description identifying i) the second stream, ii) the transcoded second stream as an alternative representation of the second stream, and iii) at least the random access point in the transcoded second stream; and request the transcoded second stream instead of the second stream on the basis of the random access point in the transcoded second stream being nearer in time to the selected time point than any random access point of the second stream.

Alternatively or additionally to indicating to the client device that a stream may be requested having a random access point in the neighborhood of a desired time point, the media description may also directly indicate the availability of a transcoded second stream having a particular random access point or a plurality of such random access points. Accordingly, the client device may directly request the transcoded second stream instead of the second stream on the basis of the random access point in the transcoded second stream being nearer in time to the desired time point than any random access point of the second stream. In a specific embodiment, the client device may, as part of its request, request a particular random access points which was indicated in the media description. In this respect, it is noted that although the media description may indicate the availability of the transcoded second stream beforehand, the actual transcoding may be performed 'on-demand', e.g., in response to an actual request for the transcoded second stream.

In an embodiment, the transcoded second stream may comprise a plurality of random access points which are more densely spaced in time along the common content timeline than the random access points of the second stream.

In an embodiment, the media description may identify the random access point as a byte range or a content timecode.

In an embodiment, the transcoded second stream consists of independently decodable frames. Alternatively, the transcoded second stream may comprise an independently decodable frame as the random access point, e.g., an I-frame, but also other non-independently decodable frames, e.g., P-frames or B-frames.

In an embodiment, the group of streams may represent a Virtual Reality (VR) video, or different camera angles of a multi-camera recording. The latter may also be referred to as a 'multi-camera multi-angle' recording. In this respect, it is noted that in general streams that are associated with a common content timeline are sometimes also referred to as 'substreams' or 'elementary streams'. As such, the group of streams may be represented by a stream having multiple substreams or elementary streams.

In an embodiment, the network interface of the network element may be configured to receive the second stream via a network from a stream source. The network element may be one of:

a network cache;
a network proxy;
a node in a Content Delivery Network (CDN);
a home gateway;
a Mobile Edge Computer (MEC);
a DASH Aware Network Element (DANE); and
a Media Aware Network Element (MANE).

In general, it may be advantageous to locate the network element nearby a network edge between a core network where a stream source may be located and an access network via which the client device is connected to the core network. Such a location may reduce the distance between the client device and the network element and thereby the latency between requesting and delivering the (transcoded version of the) second stream, whilst refraining from increasing the load on the access network, which would be the case when the network element is located in the access network. It is noted that the network element may nevertheless be located in the access network or further downstream, e.g., in the home gateway, which may still be advantageous, e.g., if a local Wi-Fi connection rather than the access network is a bottleneck.

In an embodiment, the client device may be configured to process the first stream and, upon receiving the transcoded second stream, start processing the transcoded second stream at the random access point in the transcoded second stream. For example, the client device may switch processing from the first stream to the transcoded second stream at the random access point. Alternatively, the client device may process the transcoded second stream at the random access point in the transcoded second stream, while continuing to process the first stream.

In an embodiment, the client device may be configured to switch processing from the transcoded second stream to the second stream at a subsequent random access point in the second stream. The transcoded second stream may be a temporary stream for the purpose of switching to the content of the second stream at a particular time point if such switching is not possible with the original version of the second stream, e.g., by the second stream not having a random access point in the neighborhood (vicinity). Afterwards, the client device may switch to the second stream, e.g., at any of the original random access points in the second stream. An advantage of this embodiment may be that it is not needed to transcode the second stream for a prolonged time, which may be computationally intensive. Rather, the transcoding may be temporary and cease once the client device switches to the second stream.

It will be appreciated that, in general, 'facilitating a client device to synchronize streaming and processing a second stream to streaming and processing a first stream, wherein the first stream and the second stream are part of a group of streams' may refer to 'providing a client device with time-specific access to a second stream to enable the client device to process the second stream from a selected time point onwards, wherein said time point is selected so as to synchronise the processing of the second stream to a processing of a first stream by the client device'.

It will be appreciated by those skilled in the art that two or more of the above-mentioned embodiments, implementations, and/or aspects of the invention may be combined in any way deemed useful.

Modifications and variations of the network element, the client device and/or the computer program, which correspond to the described modifications and variations of the method, and vice versa, can be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

Figure 1:
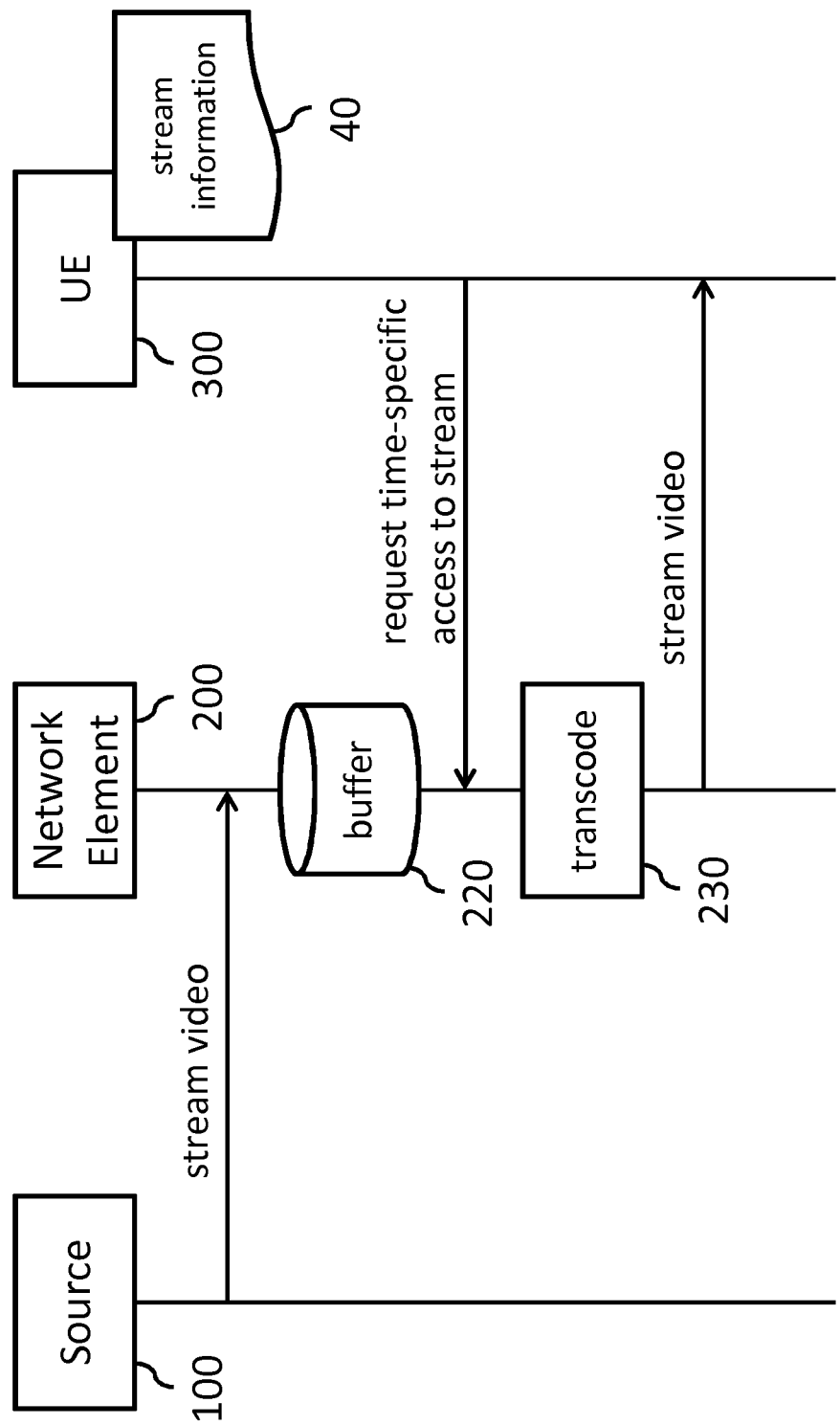
FIG. 1 shows a network element configured to buffer a stream and, upon receiving a request for streaming the stream to a client device, transcode the stream and stream the transcoded stream to the client device.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

CDN Content Delivery Network
DANE DASH Aware Network Element
DASH Dynamic Adaptive Streaming over HTTP
HAS HTTP Adaptive Streaming
HLS HTTP Live Streaming
IDR Instantaneous Decoding Refresh
IPTV Internet Protocol TV
MANE Media Aware Network Element
MEC Mobile Edge Computer
MPD Media Presentation Description
RTP Real-time Transport Protocol
RTCP RTP Control Protocol
RTSP Real Time Streaming Protocol
UE User Equipment
VR Virtual Reality
10 (segment of) first stream
20-21 (segment of) second stream
22-25 (segment of) transcoded second stream
30 random access point
40 media description
42 representation segment index
50 media segment
60-62 display order of inter-encoded video
70-72 coding order of inter-encoded video
100 stream source
120 network
140 EnodeB
200-204 network element
210 network interface
220 data storage
230 processor
300-302 client device
310 network interface
320 processor
500 method of facilitating synchronously processing streams
510 buffering second stream
520 receiving request for streaming
530 transcoding second stream
540 streaming transcoded second stream
600 computer readable medium
610 data stored on computer readable medium
1000 exemplary data processing system
1002 processor
1004 memory element
1006 system bus
1008 local memory
1010 bulk storage device
1012 input device
1014 output device
1016 network adapter
1018 application

DETAILED DESCRIPTION OF EMBODIMENTS

The following describes several embodiments of facilitating a client device to synchronize streaming and processing a second stream to streaming and processing a first stream. Here, the client device may also be referred to as 'user equipment' (UE), or 'receiver', or in VR-related embodiments as a 'VR device'.

The streams may be from a group of streams which are associated with a common content timeline. Examples of such streams include, but are not limited to, video streams such as those representing a VR video or a multi-camera recording. However, the streams do not need to be video. Rather, the streams may be of any other stream type which is encoded such that there are dependencies between parts of the stream, with such parts being frames or their equivalent. This includes, for example, means intra-encoded video, sometimes also referred to as intra-frame encoded video. Other examples may be point-cloud or mesh-based encoded scenes, which may also use dependencies between parts in time as part of their encoding.

In this respect, it is noted that streams that are associated with a common content timeline are sometimes also referred to as 'substreams' or 'elementary streams'. As such, the group of streams may be represented by a single stream having multiple substreams or elementary streams, or by multiple of such streams.

The embodiments involve enabling the client device to better synchronize the processing of the streams so that the processing of the second stream may continue at a same or similar point on the content time-line as where the processing of the first stream currently is or ceases. However, it may also be that the streaming and processing of the first stream does not cease, in which case the processing of the second stream may be synchronized with the ongoing processing of the first stream.

Here, the term 'synchronized' does not imply or require an entirely accurate synchronization. Namely, there may be differences in the timing of the processing of both streams, both in the case that the processing of the first stream ceases (in which case the difference refers to the start/stop point being 'similar' rather than the same) as well as in the case that the processing of the first stream continues. For example, when switching play-out between streams representing different camera angles, a play-out timing difference of a few 100 ms may be acceptable to users. Also, even if such timing differences are larger, they may still represent an improvement over the prior art.

FIG. 1 shows a general embodiment in which a network element 200 is shown to receive a video stream from a stream source 100 and buffer the video stream in a data storage 220. A client device 300 (indicated in FIG. 1 as user equipment or 'UE') may request time-specific access to the video stream, e.g., on the basis of stream information 40 such as a media presentation description. For example, the client device 300 may request a particular segment in case the video stream is a segmented video stream, or indicate a byte range or a content timecode in the content timeline of the video stream. The selection of the segment, byte range, content timecode, etc., may depend on a current processing of another stream by the client device 300, in that the client device 300 may desire to switch to the video stream being buffered by the network element 200 in a time-aligned manner or process both in a time-aligned manner. Such time-aligned processing or switching may be possible due to both streams belonging to a group of streams having a common content timeline. As such, the request may be indicative of a selected time point on the common content timeline.

Having received the request from the client device 300, the network element 200 may, by means of a processor 230, transcode a part of the video stream to obtain a transcoded stream, and stream the transcoded stream to the client device 300. The transcoding may be such that a random access point is created in the transcoded stream from which point onwards the client device 300 is able to decode the transcoded stream. The random access point, which may be an independently decodable frame such as an IDR-frame, may be created substantially at the selected time point, and in general such that the random access point is located nearer in time to the selected time point than any random access point of the non-transcoded stream.

It is noted that the duration of the buffering in the data storage 220 may be for any time or any amount of data which is sufficient for the transcoding to be performed, e.g., to account for inter-dependencies. For example, if a Group of Pictures (GoP) or a part of the GoP is to be transcoded, all data from the GoP may be buffered in the data storage 220. The data storage may also be used during the encoding part of the transcoding, e.g., to make use of interdependencies in the encoding so as to obtain coding efficiency. Moreover, since it may not be known which exact part of the stream will be requested, the data storage may buffer a range of frames of the stream.

The network element 200 may be part of a network, such as a content delivery network. In a specific example, the network element 200 may be positioned at an edge between a core network and an access network via which the client device 300 may be connected to the core network. In another example, the network element 200 may be positioned further upstream in the core network. The core network may comprise, or be constituted by the internet. The access network may be bandwidth constrained compared to the core network. However, these are not limitations, as in general, the network element 200 may be located upstream of the client device 300 and downstream of the stream source 100 in a network, with 'network' including a combination of several networks, e.g., the access network and core network.

Figure 2:
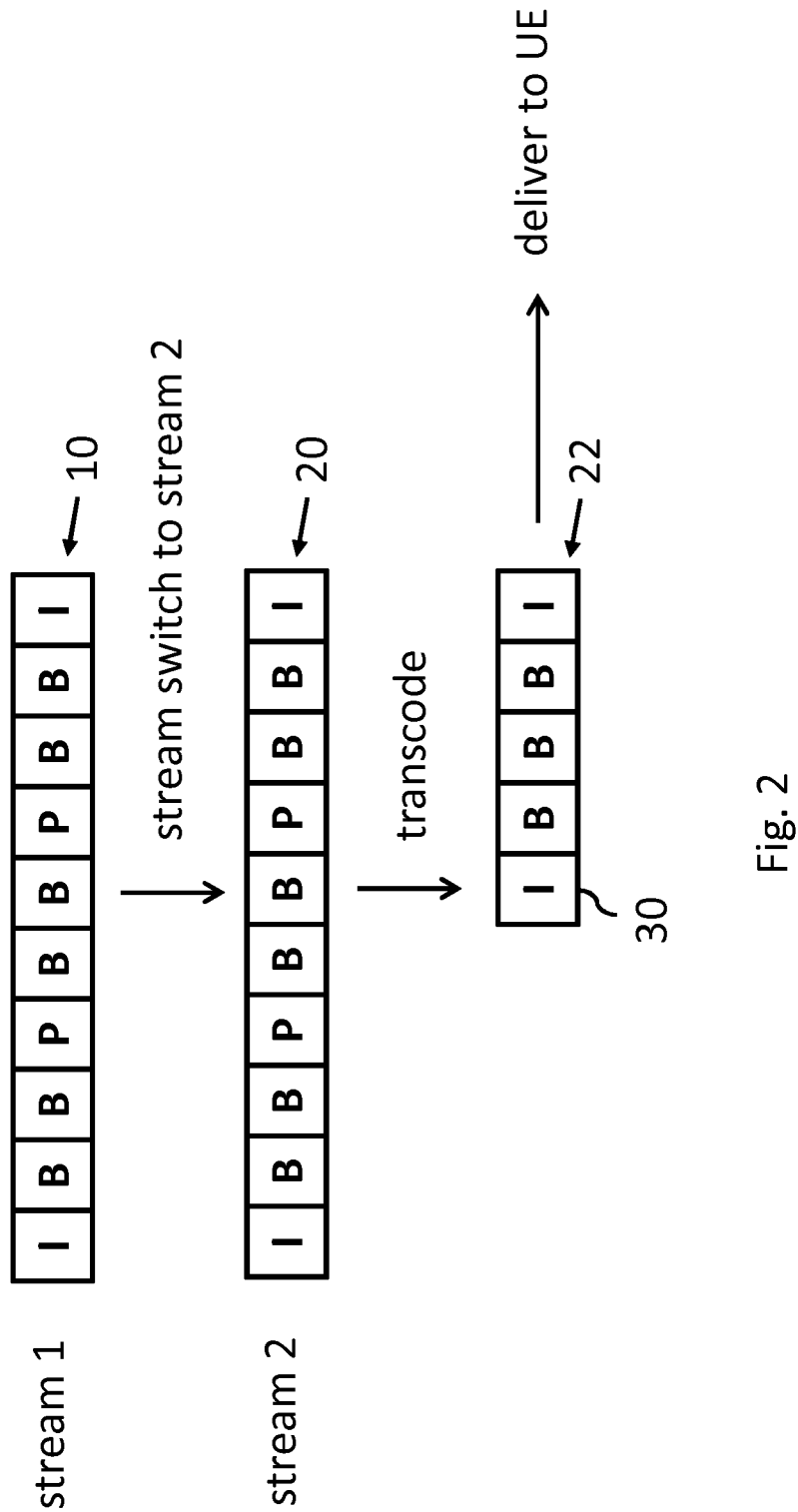
FIG. 2 illustrates the transcoding of the stream, with the transcoding involving creating a specific random access point in the transcoded stream.

FIG. 2 illustrates the transcoding of the stream, in that it shows a segment of a first stream 10, which may be currently played-out or otherwise processed by the client device, and a corresponding segment of a second stream 20. The client device may request the second stream 20, and may explicitly or implicitly indicate to the network element that it seeks to start processing the second stream 20 at a selected time point indicated by the arrow. As can be seen in FIG. 2, this selected time point falls halfway in a GoP of the second stream 20. As a result, the second stream 20 comprises a B-frame at the selected time point which is followed by a P-frame and two B-frames before the second stream comprises a next GoP which starts with an I-frame again. The earliest random access in the second stream 20 may thus be four frames later than the selected time point desired by the client device. To address this, the network element may transcode the second stream 20 to obtain a transcoded second stream 22 which may comprise a random access point 30 in the form of an I-frame at the selected time point. The transcoded second stream 22 may then be delivered to the client device. Note that this is only an example GoP. In reality, GoP sizes may be much larger and thus 'waiting' for the next I-frame may take much more delay than this example seems to imply.

It will be appreciated that the concept described with reference to FIGS. 1 and 2 may be applied to both adaptive streaming techniques as well as regular streaming techniques. An example of the former will be given under the heading 'MPEG DASH' and with reference to FIGS. 3-5, whereas an example of the latter will be given under the heading 'RTP-based streaming' and with reference to FIGS. 6 and 7. Other advantageous embodiments are also conceived with other types of streaming such as HLS, Smooth Streaming, FLASH based streaming or raw UDP streaming.

MPEG DASH

Figure 3:
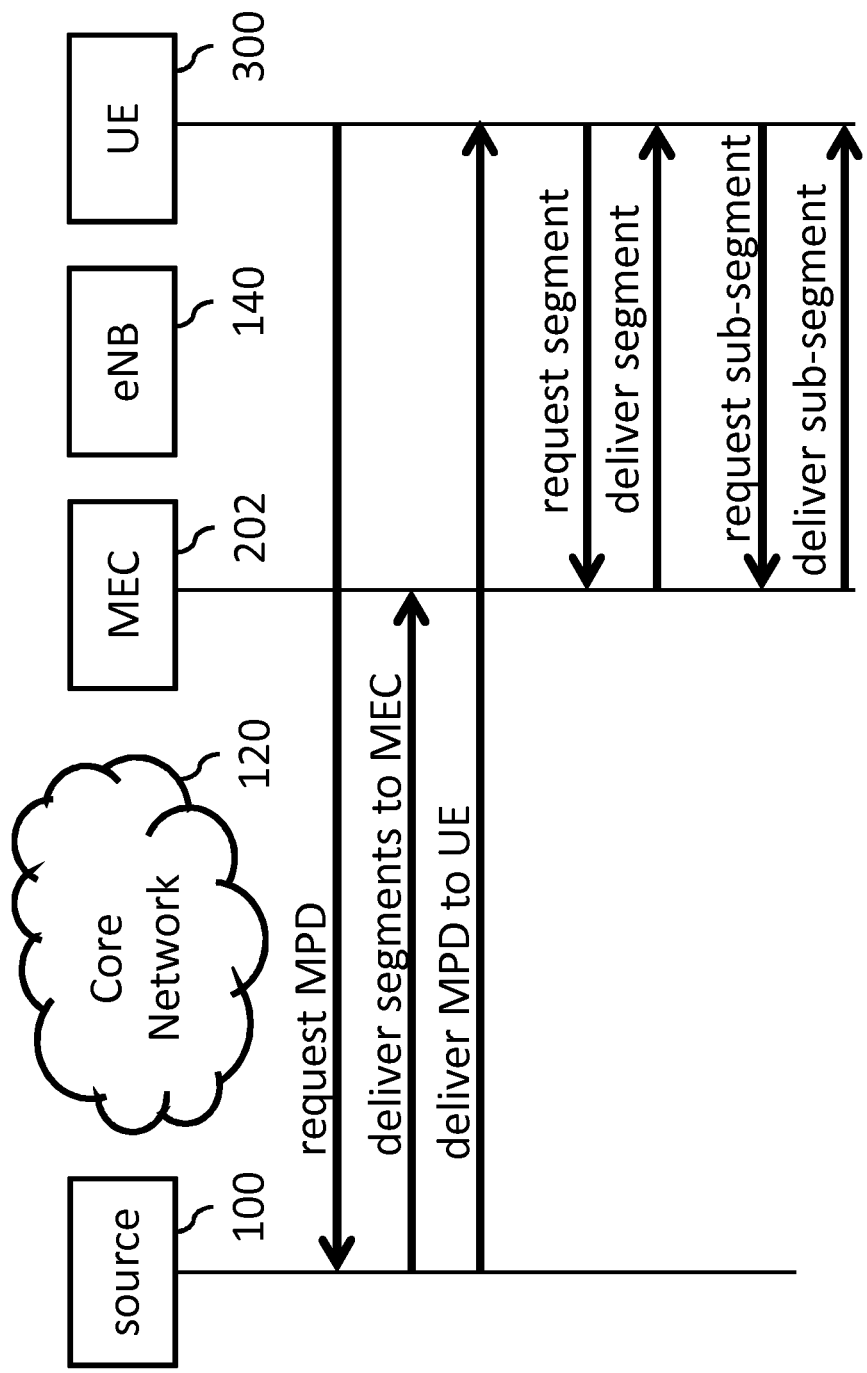
FIG. 3 shows an embodiment within the context of MPEG DASH and tiled streaming which involves streaming a VR video to a client device.

FIG. 3 shows an embodiment within the context of MPEG DASH which involves streaming a tiled VR video to a client device 300, e.g., a VR device. MPEG DASH and tiled streaming is known in the art, e.g., from Ochi, Daisuke, et al. "Live streaming system for omnidirectional video", Virtual Reality, 2015 IEEE, with the context having also been described by the co-pending application EP 16188706.2, which is hereby incorporated by reference in its entirety or at least specifically with respect to the therein described technique of caching of (a subset of) streams from a group of streams in a network cache, which may be used within the present context to predict which stream(s) are to be buffered in the data storage of the network element.

In the example of FIG. 3, the network element is a Mobile Edge Computer (MEC) 202, e.g., as proposed in 5G standardization. The MEC may provide processing power and thus transcoding capabilities nearby a base station, e.g., an eNodeB 140. By being located nearby the base station, there may be a low latency, e.g., <1 ms, to the client device 300, being in this example a mobile VR device connected to the core network 120 via the eNodeB 140. In this example, the MEC 202 may function similar to a node in a Content Delivery Network (CDN), in that it may receive segments from the stream source 100, either pushed by the stream source 100 or requested by the MEC 202, using existing CDN technology. Since the MEC 202 may receive entire segments before delivering them to the client device 300, and therefore may need to buffer them, the MEC 202 may transcode segments requested by the client device 300.

In this example, the client device 300 may first request a Media Presentation Description (MPD) from the stream source 100 via a 'request MPD' message. The stream source 100 may deliver all segments, or specifically segments which are likely to be requested by the client device 300, to the MEC 202 via 'deliver segments to MEC' data communication, while delivering the MPD to the client device 300 via a 'deliver MPD to UE' message. The MPD may describe at least two representations for each tile of the VR video, namely a regular encoded representation, and a full I-Frame encoded representation, e.g., consisting of only IDR frames.

On the basis of this information, the individual I-frames in the full-I-frame encoded representation may be requestable. By describing the full-I-frame representation beforehand to the client device 300, it is possible for the client device to quickly retrieve, when having to render a new tile, the corresponding part of a segment from the full-I-frame representation to be able to render the new tile as soon as possible and in synchronization with other tiles being rendered or having been rendered previously. Namely, the client device 300 may request a segment via a 'request segment' message, which may then be delivered by the MEC 202 via a 'deliver segment' message. The client device 300 may then request a sub-segment, e.g., in response to a head-rotation of the user causing a new tile having to be rendered, via a 'request sub-segment' message. The MEC 202 may then transcode the segment or part of the segment which comprises the requested sub-segment to obtain a transcoded sub-segment which consists of, or at least starts with, an I-frame, and deliver the transcoded sub-segment via a 'deliver sub-segment' message to the client device 300.

As the MEC in this case needs to perform some action (i.e. transcoding) based on the request, it may no longer be functioning as just a 'standard' HTTP cache for such a DASH request. The request may need to trigger the transcoding function, and may need to be queued until the transcoding function is done before it can deliver the requested data. If the request would 'try' and find the data to deliver it, and the data is not there, it may return an HTTP error message such as a 404 not found. To prevent this, the request may need to be queued until after the transcoding is finished. If this transcoding takes a long time, the client may time out. To prevent this, e.g., a 102 processing response may be sent to the client to prevent a timeout. But, this should not normally be needed as transcoding is performed on-the-fly and is done only for a limited part of the content thus is fast enough to prevent any timeouts from occurring.

Figure 4:
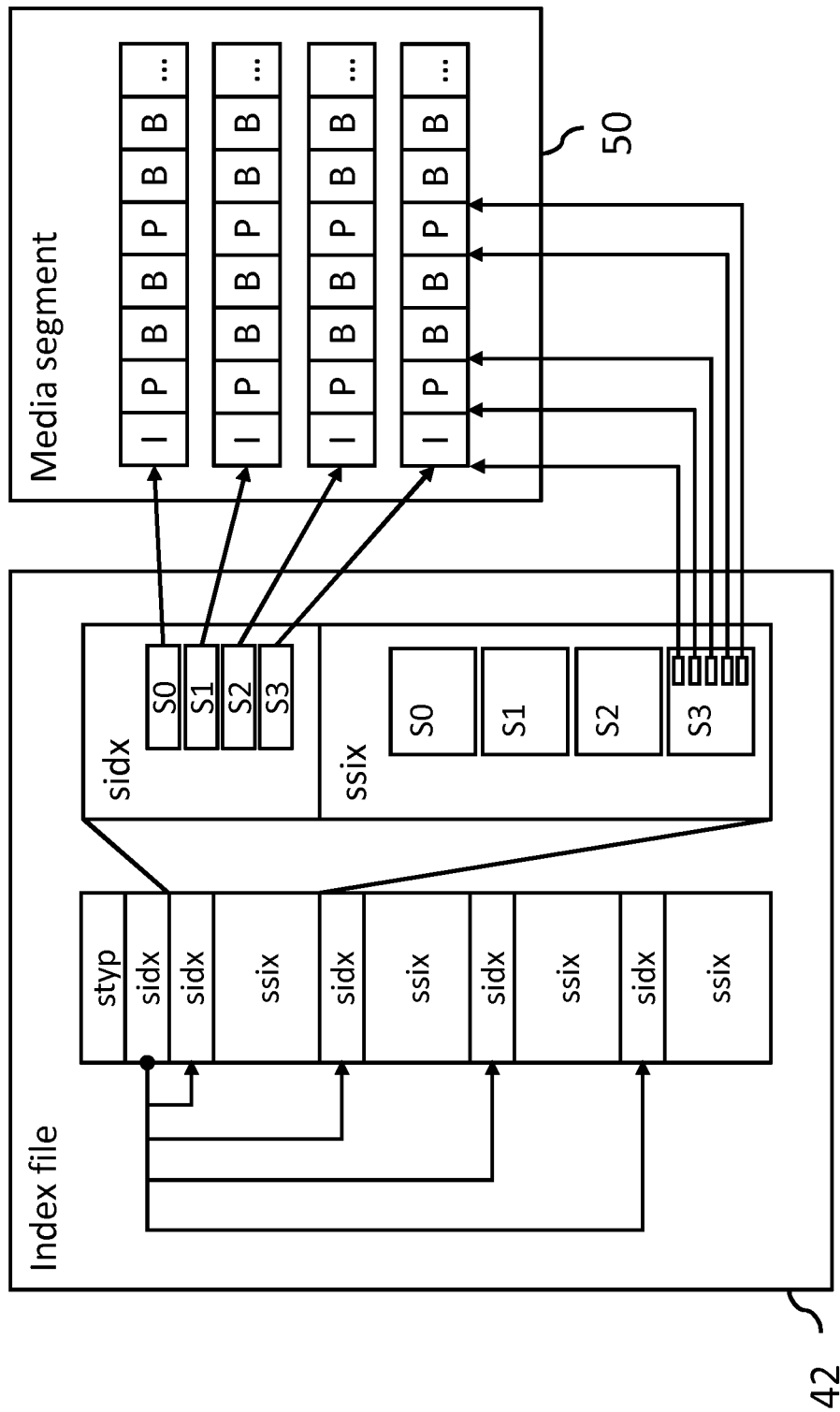
FIG. 4 shows a representation segment index of MPEG DASH.

It is noted that MPEG DASH allows for requesting parts of segments, e.g., the abovementioned sub-segments. This may be done through byte-range requests, e.g., requesting specific parts of a file. The files themselves may be described in a representation segment index 42 as shown in FIG. 4, which may comprise segment indexes ('sidx' elements in FIG. 4) and possibly sub-segment indexes ('ssix' elements in FIG. 4) for a segment 50. The 'ssix' elements may describe the sub-segment on a frame-level, indicating which byte ranges are in use for which frames.

Figure 5:
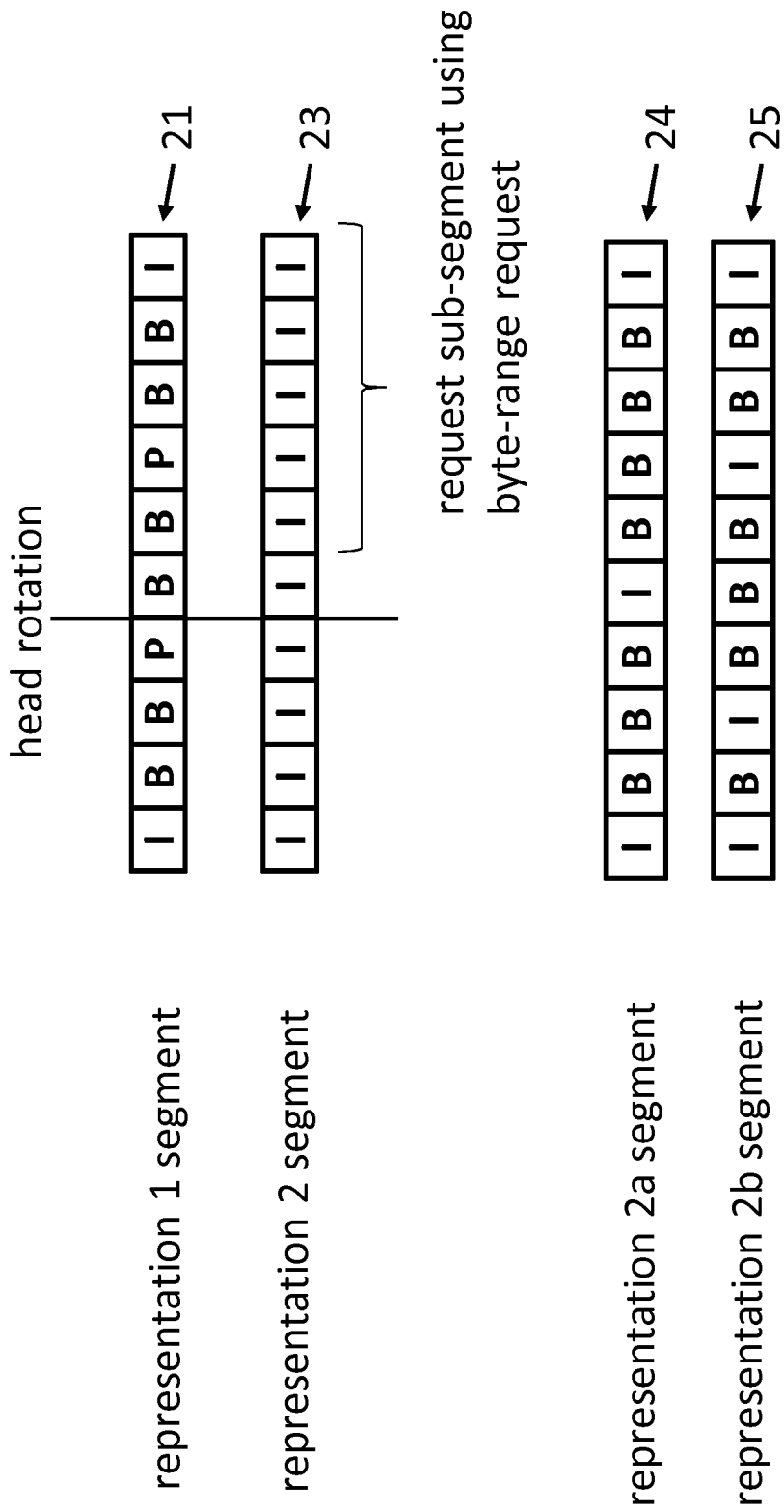
FIG. 5 shows a representation of a segment of a first stream and different representations of a corresponding segment of a second stream.

Instead of a full-I-Frame representation, which may be inefficient from a coding efficiency perspective, multiple different representations may be defined which each provide a different plurality of random access points but which do not solely consist of such random access points. This is shown in FIG. 5, where a 'normal' representation 21 of the segment is shown as well as a full I-frame encoded representation 23. In addition or alternatively to the latter, several different representations 24, 25 of the segment may be described in the representation segment index which may together provide a collection of random access points, which in the example of representations 24, 25 provide access to every other frame. Such representations may increase coding efficiency compared to a full I-frame encoded representation, but may require the client device to retrieve more index data.

As another alternative, a full-I-Frame representation may be indicated to the client, e.g., by way of the representation segment index or other media description, but the transcoding may provide a stream which starts with an I-frame while otherwise using a more efficient coding representation, e.g., by also using B- and/or P-frames so as to obtain a higher coding efficiency compared to a full-I-Frame representation. The client device may simply decode this stream. Alternatively, the client device may be modified so as to 'accept' and thus decode a stream which is different from the representation segment index, or in general, different from the media description.

It is noted that the above embodiment involving MPEG DASH may be modified to allow time-based requests instead of byte-range requests. However, this may require modification of the network element, being in this example a MPEG DASH server. Namely, an MPEG DASH server is typically a regular HTTP server which directly supports byte-range requests. The MPEG DASH server may be modified to translate a time-based request for a certain representation into a proper segment request. For this purpose, new segments may be defined on-the-fly. For example, the sub-segment described with reference to FIG. 3 may be defined as a new segment.

RTP-Based Streaming

Figure 6:
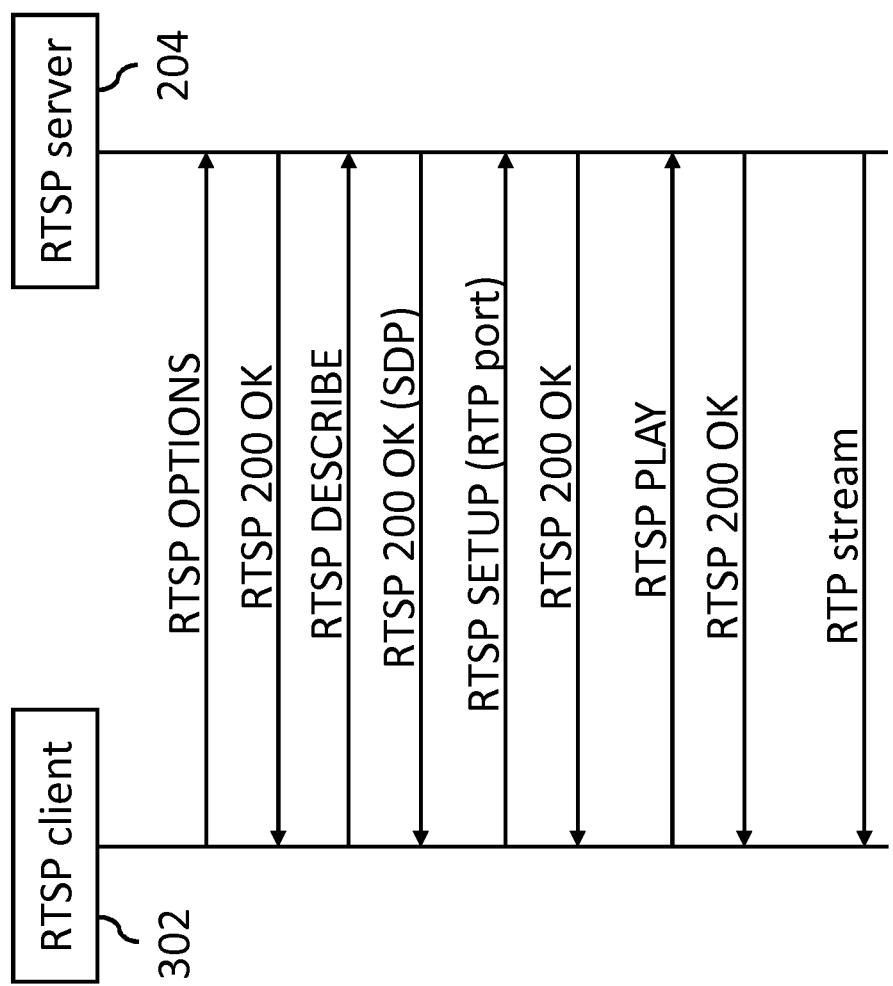
FIG. 6 shows a message exchange according to the RTSP protocol.
Figure 7:
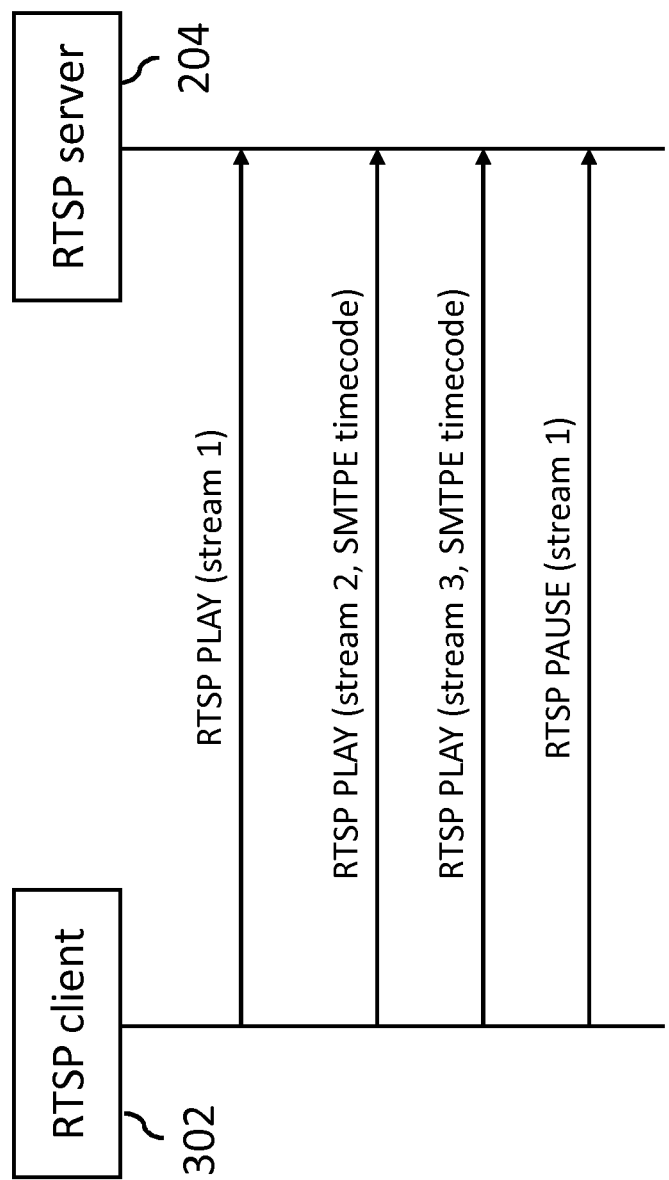
FIG. 7 shows an embodiment within the context of RTSP based streaming which involves switching streams to switch cameras in a multi-camera recording.

FIGS. 6 and 7 relate to an embodiment within the context of RTP-based streaming of streams which represent different camera recordings of a same scene. Similar to the earlier described embodiment relating to VR video, there is again here a time-dependence between streams, and thus a need to access a stream at a specific point instead of at a random point. Such streams may be streamed via RTP (Real-time Transport Protocol, IETF RFC 3550). There are various protocols to request RTP streams. In case of multicast streams and unicast burst to support fast channel change, RTCP (RTP Control Protocol, IETF RFC 3550) may be used for rapid acquisition, as described in IETF RFC 6285. In case of unicast streams, RTSP (Real Time Streaming Protocol, IETF RFC 2326) may be used to retrieve streams. RTSP allows for joining a certain stream, and then using control commands such as 'play' and 'pause', as shown in FIG. 6 by way of a message exchange between a RTSP client 302 and a RTSP server 204. The 'play' command supports indicating a range to play-out, thereby enabling the RTSP client 302 to indicate from which point in time onwards a stream should be played-out. This point in time may be indicated using timecodes such as SMPTE timecodes, NPT (Normal Play Time) ranges and clock time (absolute time).

In a specific example, the RTSP client 302 may choose between three streams representing different camera recordings (e.g., camera angles) of a same event. As shown in FIG. 7, the RTSP client 302 may first start streaming one stream by way of a message 'RTSP PLAY (stream 1)'. For this stream, there may not be timing constraints. The RTSP client 302 may subsequently request the additional camera recordings of the event. The respective streams may then be delivered in such a way that their play-out is synchronized with that of the first stream. This may be accomplished by the RTSP client 302 determining the play-out timing of the first stream, and then requesting the play-out of the second stream while indicating the desired timecode, e.g., via a message 'RTSP PLAY (stream 2, SMTPE timecode)' and later on via a message 'RTSP PLAY (stream 3, SMTPE timecode)'. Here, the SMTPE timecode may be defined as HH:MM:SS:FF, e.g., hours, minutes, seconds and frames.

It will be appreciated that since delivery of a new stream may take some time, e.g., due to delays relating to the buffering, transcoding and transmission of the stream, the RTSP client 302 may request the new stream a few frames ahead. The number of frames (or time, bytes) ahead may be estimated, e.g., based on a measurement of the delay between request and delivery, or indicated by heuristics. It is further noted that the RTSP server 204 may be positioned close to the RTSP client 302 in the network, e.g., on a CDN node, an edge node, a MEC, etc., so as to reduce the delay between requesting a new stream and the new stream being delivered.

Inter-Encoded Video

With inter-encoded video, frames are not encoded in the order they are displayed. This may be taken into account in the buffering, transcoding and delivery of streams. Namely, if access is requested to a particular frame, then not only this frame may need to be transcoded but also other frames may need to be decoded as reference frames, e.g. in case of frame dependencies, while subsequent frames that are dependent on the frame may also need to be transcoded until a next GoP is accessed (which may not have to be transcoded as it can be played-out as is).

Figure 8:
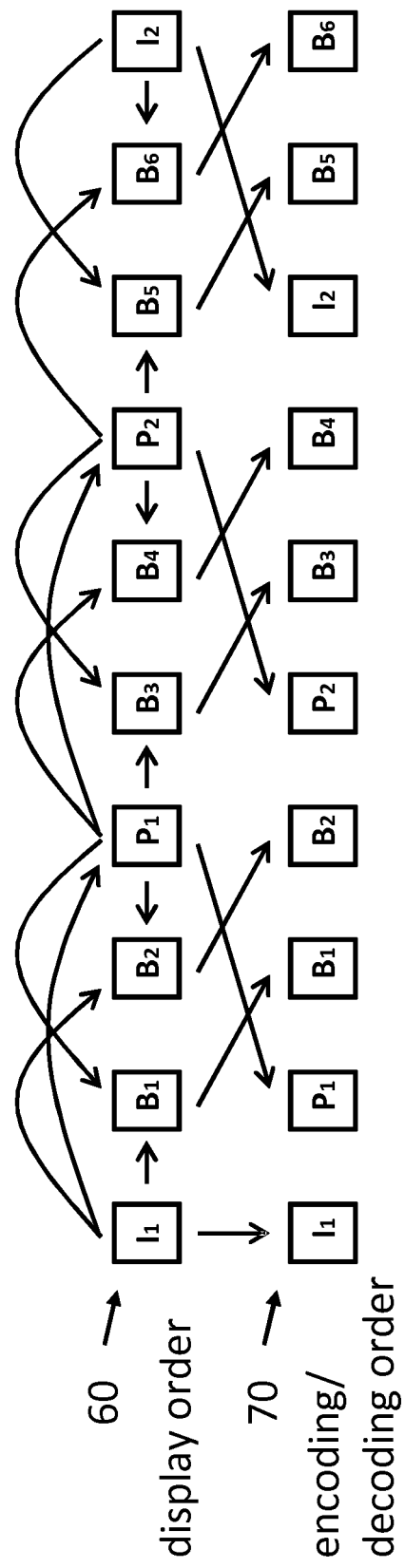
FIGS. 8 and 9 illustrate inter-encoded video in which frames are encoded in a different order than they are displayed.
Figure 9:
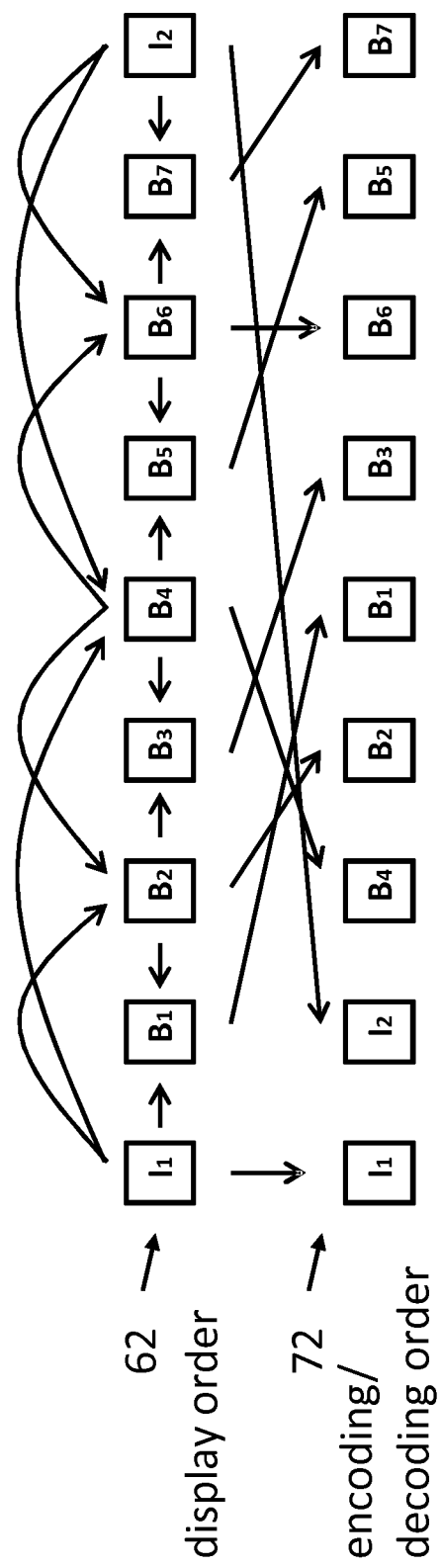

A first example of an inter-encoded video is shown in FIG. 8 where a display order 60 and an encoding/decoding order 70 are shown for a particular GoP. Here, the arrows above the display order row 60 represent frame dependencies, denoting which frame is a reference for which other frame(s). The arrows between the display order row 60 and the encoding/decoding order row 70 show the frame order reshuffling, as may also be seen from the frame numbers. Another example is shown in FIG. 9 having a display order 62 and an encoding/decoding order 72. Depending on the encoding, a number of frames may need to be available to start decoding a particular frame. For example, if a client device requests access to the B3 frame of FIG. 9, then first the I1, I2, B2 and B4 frames may need to be available before decoding may commence. This may indicate the buffering requirements at network element in that these frames need to be buffered in order to be able to transcode the particular stream or segment.

General Aspects

Although the described embodiments relate using MPEG DASH for VR streaming and RTP-based streaming for multi-angle video, the converse is also possible: RTP-based VR streaming and multi-angle video streaming via MPEG DASH.

In both the MPEG DASH and RTSP embodiments, as well as in general, the client may determine the content part being currently played-out. For example, the client may identify a content timecode. This content timecode or other indication of time point may be provided to the network element, e.g., by indicating a specific byte range or by indicating a specific content timecode. It is noted that in MPEG DASH, the MPD and the segment index provide the relationship between times and byte ranges.

The transcoded stream may only comprise a part which is transcoded, e.g., the GoP or part thereof which comprises the requested random access point. Following GoPs may then be delivered to the client device without being transcoded. Effectively, the transcoded stream may revert back to the non-transcoded version of the stream. Alternatively, the client device may switch from streaming and processing the transcoded version of the stream to streaming and processing the non-transcoded version of the stream, e.g., at an existing random access point in the non-transcoded version of the stream.

The client device may need to be provided with information on how to request a particular stream at a particular time. For that purpose, a media description may be provided to the client device, e.g., a service announcement, EPG, MPD, etc.

The transcoding may be faster than real-time. This may be especially feasible for transcoding tiled parts of very high resolution VR videos, e.g., a full 360 degree VR video, since in this situation the individual tiles are typically relatively small.

The stream source, which may be a server such as an origin server, a recording device, a distributed stream source, cloud-based stream source etc., may also provide the transcoding functionality as described in this specification. The network element as described in this specification may thus be the stream source.

With MPEG DASH, the client may request a whole sub-segment, but may also request individual parts, e.g., each I-frame separately. This may reduce delay, as the network element may deliver the transcoded frame immediately instead of waiting until the entire sub-segment has been transcoded. Alternatively, a whole sub-segment may be requested but output data from the transcoder may be sent as soon as it becomes available, effectively 'streaming' the sub-segment as it is being created.

The transcoded stream may be re-used for other users, either directly or after first buffering the transcoded stream. This may be particularly advantageous for live streams which may be streamed to a significant number of client devices.

The network element may already transcode the stream before actually receiving a request for the stream. For example, the request may be deemed likely, e.g., based on prediction techniques as described in the co-pending application EP 16188706.2. Such transcoding may involve generating a full I-frame representation, or a representation having densely distributed I-frames, e.g., every two or three frames.

It will be appreciated that in addition to the described embodiments which involve switching between, or simultaneously processing of, time-aligned streams, the invention may also be used for time-specific random access in video-on-demand.

Figure 10:
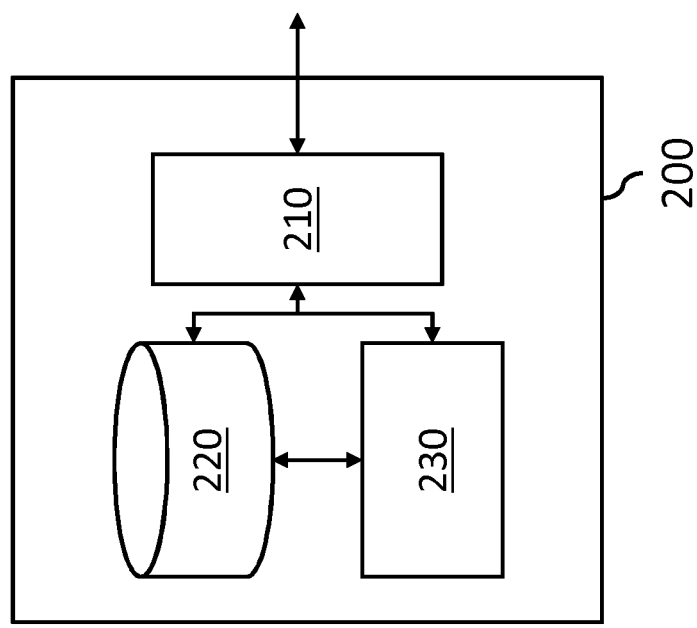
FIG. 10 shows an exemplary network element which comprises a data storage to buffer a stream and which is configured to transcode the stream on request.

FIG. 10 shows an exemplary network element 200. The network element 200 may comprise a network interface 210 for communicating with a network. The network interface 210 may be, but is not limited to, an Ethernet or fiber optic-based local or wide area network (LAN, WAN) interface, or a wireless interface, e.g., according to Wi-Fi, 4G or 5G telecommunication standards. The network element 200 may further comprise a data storage 220 for buffering data including but not limited to the 'second stream' as described in this specification. The data storage 220 may be any suitable type of data storage, e.g., one or more hard disks, solid state disks, or other types of data storage. The network element 200 may further comprise a processor 230 configured to transcode the second stream to obtain a transcoded second stream, and to create a random access point in the transcoded second stream from which point onwards a client device is able to decode the transcoded second stream, wherein the random access point is nearer in time to the selected time point than any random access point of the second stream. The network interface 210 may be further configured to stream the transcoded second stream to the client device. The processor 230 may be configured to perform any of the processor-implementable functions of the network element described in this specification. Another exemplary embodiment of the network element will be described with reference to FIG. 14.

It will be appreciated that the network element may take any suitable form, including but not limited to a network cache, a network proxy, a node in a Content Delivery Network (CDN), a home gateway, a Mobile Edge Computer (MEC), a DASH Aware Network Element (DANE) and a Media Aware Network Element (MANE).

Figure 11:
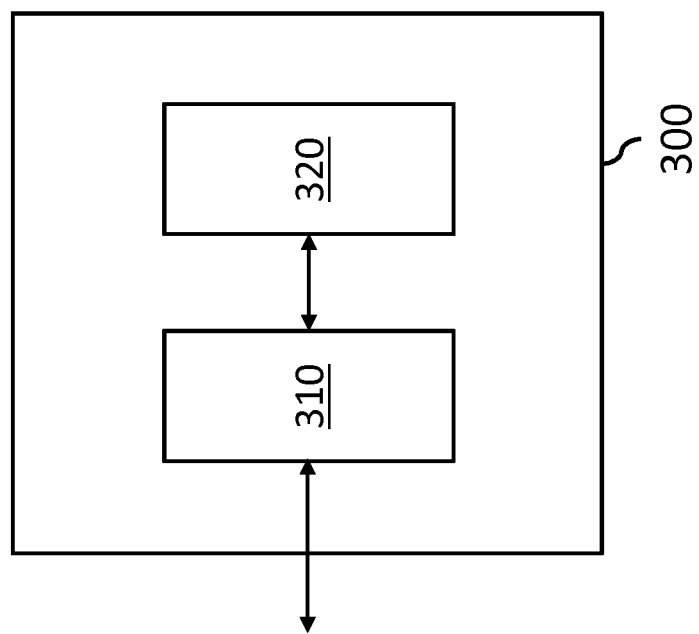
FIG. 11 shows an exemplary client device.

FIG. 11 shows an exemplary client device 300, which may comprise a network interface 310 for communicating with a network. The network interface 310 may be, but is not limited to, an Ethernet or fiber optic-based local or wide area network (LAN, WAN) interface or a wireless interface, e.g., according to Wi-Fi, 4G or 5G telecommunication standards. The client device 300 may further comprise a processor 320 configured to determine, when processing a first stream of the group of streams, a selected time point on the common content timeline from which point onwards a second stream of the group of streams is to be processed, and indicate the selected time point via the network interface 310 to a network element which is buffering the second stream to cause the network element to transcode the second stream to obtain a transcoded second stream having a random access point at or within a neighborhood of the selected time point. The processor 320 may be configured to perform any of the processor-implementable functions of the client device described in this specification. Another exemplary embodiment of the client device will be described with reference to FIG. 14.

It will be appreciated that the client device may take any suitable form, including but not limited to televisions, monitors, projectors, media players and recorders, set-top boxes, smartphones, personal computers, laptops, tablet devices, audio systems, smart watches, etc., as well as customer-premises equipment.

In case the group of streams represent a VR video, the client device maybe a VR device. An example of a VR device may be a smartphone or tablet device which is to be used in a VR enclosure, e.g., of a same or similar type as the 'Gear VR' or 'Google Cardboard'. Alternatively, the VR device may be connected to a display or VR headset and may provide rendered images to the display or VR headset for display thereon. A specific example is that the VR device may be represented by a personal computer or game console which is connected to a separate display or VR headset, e.g., of a same or similar type as the 'Oculus Rift', 'HTC Vive' or 'PlayStation VR'. Other examples of VR devices are so-termed Augmented Reality (AR) devices that are able to play-out VR video, such as the Microsoft HoloLens.

Figure 12:
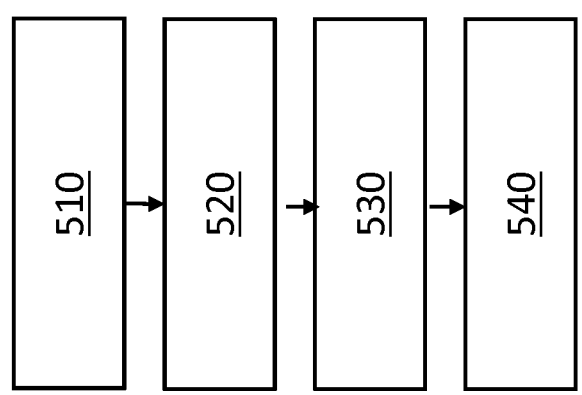
FIG. 12 shows a method of facilitating switching streams.

FIG. 12 shows a method 500 of facilitating a client device to synchronize streaming and processing a second stream to streaming and processing a first stream, wherein the first stream and the second stream are part of a group of streams, wherein the streams of the group are associated with a common content timeline.

The method 500 may comprise, in an operation titled "BUFFERING SECOND STREAM", buffering 510 the second stream in a data storage. The method 500 may further comprise, in an operation titled "RECEIVING REQUEST FOR STREAMING", receiving 520 a request for streaming a content part of the second stream to the client device, the request being indicative of a selected time point on the common content timeline from which point onwards the second stream is to be processed. The method 500 may further comprise, in an operation titled "TRANSCODING SECOND STREAM", transcoding 530 the second stream to obtain a transcoded second stream, wherein the transcoding is configured to create a random access point in the transcoded second stream from which point onwards the client device is able to decode the transcoded second stream, wherein the random access point is nearer in time to the selected time point than any random access point of the second stream. The method 500 may further comprise, in an operation titled "STREAMING TRANSCODED SECOND STREAM", streaming 540 the transcoded second stream to the client device.

It will be appreciated that the above operation may be performed in any suitable order, e.g., consecutively, simultaneously, or a combination thereof, subject to, where applicable, a particular order being necessitated, e.g., by input/output relations. For example, operations 520 and 530 may be reversed in order.

Figure 13:
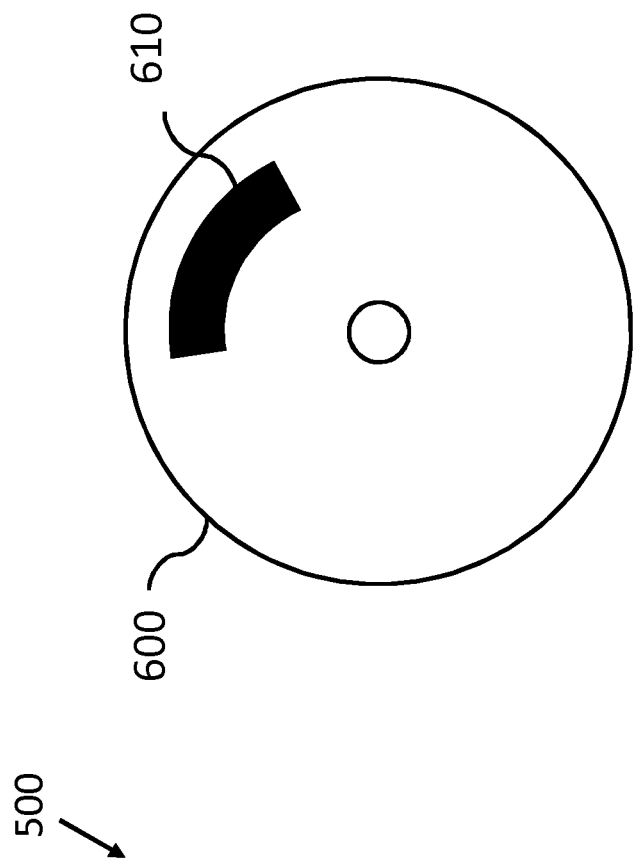
FIG. 13 shows a non-transitory computer-readable medium comprising a computer program with instructions for a processor system to perform the method.

The method 500 may be implemented on a processor system, e.g., on a computer as a computer implemented method, as dedicated hardware, or as a combination of both. As also illustrated in FIG. 13, instructions for the computer, e.g., executable code, may be stored on a computer readable medium 600, e.g., in the form of a series 610 of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 13 shows an optical disc 600.

Alternatively, the computer-readable medium 600 may comprise a transcoded stream as described in this specification.

Figure 14:
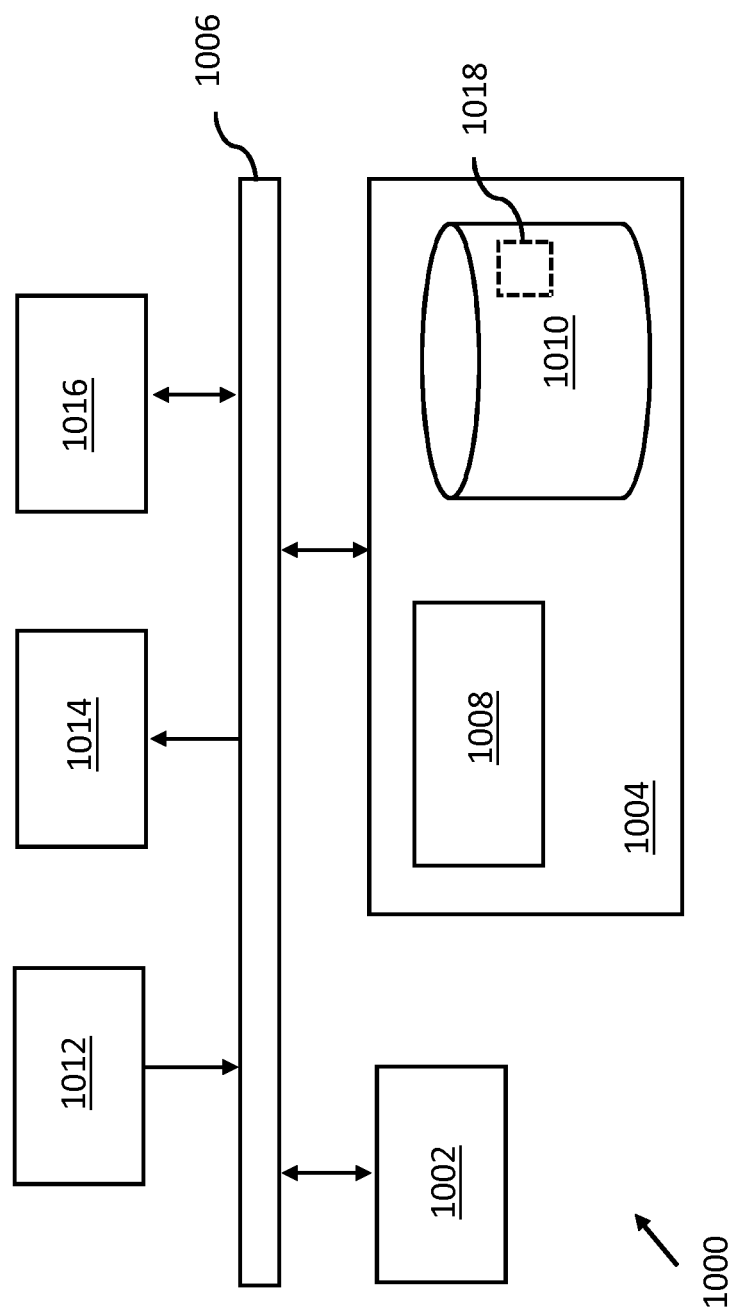
FIG. 14 shows an exemplary data processing system.

FIG. 14 is a block diagram illustrating an exemplary data processing system that may be used in the embodiments of this disclosure. Such data processing systems include data processing entities described in this disclosure, including but not limited to the network element and the client device. Data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1006. In one aspect, data processing system may be implemented as a computer that is suitable for storing and/or executing program code. It will be appreciated, however, that data processing system 1000 may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The processing system 1000 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 may optionally be coupled to the data processing system. Examples of input devices may include, but are not limited to, for example, a microphone, a keyboard, a pointing device such as a mouse, or the like. Examples of output devices may include, but are not limited to, for example, a monitor or display, speakers, or the like. Input device and/or output device may be coupled to data processing system either directly or through intervening I/O controllers. A network adapter 1016 may also be coupled to, or be part of, the data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 14, memory elements 1004 may store an application 1018. It should be appreciated that the data processing system 1000 may further execute an operating system (not shown) that may facilitate execution of the application. The application, being implemented in the form of executable program code, may be executed by data processing system 1000, e.g., by the processor 1002. Responsive to executing the application, the data processing system may be configured to perform one or more operations to be described herein in further detail.

In one aspect, for example, the data processing system 1000 may represent a network element. In that case, the application 1018 may represent an application that, when executed, configures the data processing system 1000 to perform the various functions described herein with reference to the 'network element' and all its embodiments. In another aspect, the data processing system 1000 may represent a client device. In that case, the application 1018 may represent an application that, when executed, configures the data processing system 1000 to perform the various functions described herein with reference to the 'client device' and all its embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method for facilitating a client device to synchronize streaming and processing a second stream to streaming and processing a first stream, wherein the first stream and the second stream are part of a group of streams, wherein the streams of the group are associated with a common content timeline, and wherein the method comprises:
   buffering the second stream in a data storage;
   receiving a request for streaming a content part of the second stream to the client device, the request being indicative of a selected time point on the common content timeline from which point onwards the second stream is to be processed;
   after receiving the request indicative of the selected time point, transcoding the content part of the second stream to obtain a transcoded second stream, wherein the transcoding is configured to create a random access point in the transcoded second stream from which point onwards the client device is able to decode the transcoded second stream, wherein the random access point is nearer in time to the selected time point than any random access point of the second stream;
   streaming the transcoded second stream to the client device; and
   streaming the second stream to the client device.

2. The method according to claim 1, wherein the random access point is created as an independently decodable frame positioned on the common content timeline immediately preceding, immediately following or directly at the selected time point.

3. The method according to claim 1, further comprising receiving an indication from the client device of the selected time point in the form of a byte range or a content timecode in the common content timeline.

4. The method according to claim 1, further comprising:
   generating a media description identifying the second stream, the media description being indicative that the second stream may be requested by the client device having a determinable random access point at or within a neighborhood of a time point in the common content timeline which is selectable by the client device; and
   providing the media description to the client device.

5. The method according to claim 1, further comprising:
   generating a media description identifying i) the second stream ii) the transcoded second stream as an alternative representation of the second stream, and iii) at least the random access point in the transcoded second stream;
   providing the media description to the client device to enable the client device to request the transcoded second stream instead of the second stream on the basis of the random access point in the transcoded second stream being nearer in time to the selected time point than any random access point of the second stream.

6. The method according to claim 5, wherein the media description identifies the random access point as a byte range or a content timecode.

7. The method according to claim 1, wherein the transcoded second stream consists of independently decodable frames.

8. The method according to claim 1, wherein the group of streams represents:
   a Virtual Reality (VR) video; or
   different camera angles of a multi-camera recording.

9. A transitory or non-transitory computer-readable medium comprising a computer program, the computer program comprising instructions for causing a processor system to facilitate a client device to synchronize streaming and processing a second stream to streaming and processing a first stream, wherein the first stream and the second stream are part of a group of streams, wherein the streams of the group are associated with a common content timeline, by:

buffering a second stream in a data storage;

receiving a request for streaming a content part of the second stream to a client device, the request being indicative of a selected time point on a common content timeline from which point onwards the second stream is to be processed;

after receiving the request indicative of the selected time point, transcoding the content part of the second stream to obtain a transcoded second stream, wherein the transcoding is configured to create a random access point in the transcoded second stream from which point onwards the client device is able to decode the transcoded second stream, wherein the random access point is nearer in time to the selected time point than any random access point of the second stream;

streaming the transcoded second stream to the client device; and streaming the second stream to the client device.

10. A network element configured to facilitate a client device to synchronize streaming and processing a second stream to streaming and processing a first stream, wherein the first stream and the second stream are part of a group of streams, wherein the streams of the group are associated with a common content timeline, and wherein the network element comprises:

a data storage configured to buffer the second stream;

a network interface configured to receive a request for streaming a content part of the second stream to the client device, the request being indicative of a selected time point on the common content timeline from which point onwards the second stream is to be processed;

a processor configured to, after the receiving of the request indicative of the selected time point, transcode the content part of the second stream to obtain a transcoded second stream, and to create a random access point in the transcoded second stream from which point onwards the client device is able to decode the transcoded second stream, wherein the random access point is nearer in time to the selected time point than any random access point of the second stream;

wherein the network interface is further configured to stream the transcoded second stream to the client device and to stream the second stream to the client device.

11. The network element according to claim 10, further comprising a network interface configured to receive the second stream via a network from a stream source, wherein the network element is one of:

a network cache;
a network proxy;
a node in a Content Delivery Network (CDN);
a home gateway;
a Mobile Edge Computer (MEC);
a DASH Aware Network Element (DANE); and
a Media Aware Network Element (MANE).

12. A client device configured for streaming and processing a selected stream of a group of streams, wherein the streams of the group are associated with a common content timeline, and wherein the client device comprises:

a network interface to a network for receiving said selected stream; and a processor configured to:

determine, when processing a first stream of the group of streams, a selected time point on the common content timeline from which point onwards a second stream of the group of streams is to be processed;

indicate the selected time point via the network interface to a network element which is buffering the second stream to cause the network element to transcode a content part of the second stream to obtain a transcoded second stream having a random access point at or within a neighborhood of the selected time point, wherein the random access point is nearer in time to the selected time point than any random access point of the second stream;

upon receiving the transcoded second stream, start processing the transcoded second stream at the random access point in the transcoded second stream; and switch processing from the transcoded second stream to the second stream at a subsequent random access point in the second stream.

13. The client device according to claim 12, wherein the client device is further configured to:

receive a media description identifying the second stream, the media description further comprising an indication that the second stream may be requested by the client device having a random access point at or within a neighborhood of a time point in the content timeline which is selectable by the client device; and indicate the selected time point to the network element as part of a request for streaming the second stream.

14. The client device according to claim 12, wherein the client device is further configured to:

receive a media description identifying i) the second stream, ii) the transcoded second stream as an alternative representation of the second stream, and iii) at least the random access point in the transcoded second stream; and request the transcoded second stream instead of the second stream on the basis of the random access point in the transcoded second stream being nearer in time to the selected time point than any random access point of the second stream.

\* \* \* \* \*

UNITED STATES PATENT AND TRADEMARK OFFICE
CERTIFICATE OF CORRECTION

PATENT NO. : 11,109,092 B2
APPLICATION NO. : 16/470518
DATED : August 31, 2021
INVENTOR(S) : Hans Maarten Stokking and Omar Aziz Niamut It is certified that error appears in the above-identified patent and that said Letters Patent is hereby corrected as shown below:

In the Claims

In Column 20, Line 60, Claim 9, delete "transitory or".

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*